(12) United States Patent
Cooper et al.

(10) Patent No.: US 12,050,160 B2
(45) Date of Patent: Jul. 30, 2024

(54) LEAK DETECTION SYSTEM AND METHOD

(71) Applicant: Sepha Limited, Belfast (GB)

(72) Inventors: Philip Cooper, Belfast (GB); Adam Osborne, Belfast (GB); Marcin Kusnierz, Lubin (PL)

(73) Assignee: Sepha Limited, Belfast (GB)

( * ) Notice: Subject to any disclaimer, the term of this patent is extended or adjusted under 35 U.S.C. 154(b) by 156 days.

(21) Appl. No.: 17/336,196

(22) Filed: Jun. 1, 2021

(65) Prior Publication Data

US 2021/0372879 A1 Dec. 2, 2021

(30) Foreign Application Priority Data

Jun. 2, 2020 (GB) ..................................... 2008294

(51) Int. Cl.
*G01M 3/32* (2006.01)
*G01N 3/12* (2006.01)
(52) U.S. Cl.
CPC ............. *G01M 3/3218* (2013.01); *G01N 3/12* (2013.01)
(58) Field of Classification Search
CPC ...... G01M 3/3218; G01M 3/363; G01M 3/38; G01M 3/02; G01N 3/12; H05K 3/3494
See application file for complete search history.

(56) References Cited

U.S. PATENT DOCUMENTS

| 5,307,139 A | 4/1994 | Tyson | |
|---|---|---|---|
| 2007/0119260 A1* | 5/2007 | Cox | .......................... G01N 3/08 73/820 |
| 2012/0143530 A1* | 6/2012 | Engstrand | ............... G01F 19/00 702/49 |
| 2012/0307044 A1* | 12/2012 | Barker | ................ G01M 3/3281 348/125 |

(Continued)

FOREIGN PATENT DOCUMENTS

EP 3730915 A1 * 10/2020 ........... B07C 5/3404
GB 2384554 7/2003

OTHER PUBLICATIONS

UK IPO Search report dated Feb. 23, 2021 for patent application No. GB2008294.7.

(Continued)

*Primary Examiner* — John Fitzgerald
*Assistant Examiner* — Truong D Phan
(74) *Attorney, Agent, or Firm* — Quarles & Brady LLP

(57) ABSTRACT

Systems and methods for detecting leaks in flexible packets with a test bed, a pressure chamber to apply a first pressure and a second pressure to the packet, producing a first volume and second volume for the packet. An illumination source and an illumination detector to produce a first image dataset of the packet at the first pressure and a second image dataset of the packet at the second pressure, a processor connected to the illumination detector to receive the first and second image datasets and determine the first volume and the (Continued)

second volume and use the first volume and the second volume to determine a change in volume, compare the change of volume with a threshold and when the change of volume is greater than the threshold determine the packet is leak-free and when the change of volume is less than the threshold determines the packet has a leak.

18 Claims, 3 Drawing Sheets

(56) References Cited

U.S. PATENT DOCUMENTS

2016/0050401 A1* 2/2016 Gordon .............. G01B 11/2513
348/744
2017/0186166 A1* 6/2017 Grunnet-Jepsen ... H04N 13/243

OTHER PUBLICATIONS

Office Action in related GB App. No. GB2008294.7, mailed Nov. 27, 2023, 4 pages.
Office Action in related GB App. No. GB2008294.7, mailed May 1, 2024, 3 pages.

* cited by examiner

LEAK DETECTION SYSTEM AND METHOD

This application claims priority to and the benefit of UK Patent Application No. 2008294.7, filed Jun. 2, 2020, the entire disclosure of which is incorporated by reference herein.

SUMMARY

The invention relates to a system and method for detecting leaks in flexible packets, particularly, but not exclusively, detecting leaks in flexible packets such as blister packs, strip packs and sachets.

It is common to provide substances and goods, such as pharmaceuticals, health products, foods, medical devices, in flexible packets which are resistant to the passage of air into or out of the packet. These flexible packets can include sachets comprising flexible layers sealed at the edges or include blister packs or strip packs having at least one container comprising a pocket sealed with a flexible cover. For various contents of such packets, for example pharmaceuticals, it is important that the flexible packets are airtight. Otherwise, the efficacy and shelf-life of the contents can be impaired. A variety of systems and methods exist for the detection of leaks in packets, such as vacuum decay test methods. However, many of these do not provide the leak detection accuracy required by current flexible packet manufacturers and users.

According to a first aspect of the invention there is provided a leak detection system for detecting leaks in flexible packets, comprising
  a test bed which supports at least one packet comprising at least one flexible portion,
  a pressure chamber containing the test bed and the packet which applies a first pressure to the packet producing a first volume of the flexible portion of the packet and then applies a second pressure to the packet producing a second volume of the flexible portion of the packet,
  an illumination source which produces structured illumination which is incident on the packet at the first pressure and the second pressure,
  an illumination detector which captures illumination reflected from the packet at the first pressure and produces a first image dataset of the packet and which captures illumination reflected from the packet at the second pressure and produces a second image dataset of the packet,
  a processor connected to the illumination detector to receive the first and second mage datasets of the packet and which determines the first volume of the flexible portion of the packet at the first pressure, determines the second volume of the flexible portion of the packet at the second pressure, uses the first volume and the second volume to determine a change in volume of the flexible portion of the packet between the first and second pressures, compares the change of volume with a threshold and when the change of volume is greater than the threshold determines that the packet is leak-free and when the change of volume is less than the threshold determines that the packet has at least one leak.

The test bed may comprise a substantially flat surface which supports the at least one packet. The test bed may support the at least one packet with the at least one flexible portion outermost.

The illumination source and the illumination detector may be placed outside the pressure chamber. The pressure chamber may comprise at least one transparent section through which the illumination incident on the packet and the illumination reflected from the packet passes. The illumination source and the illumination detector may be placed inside the pressure chamber.

The first pressure may be greater than atmospheric pressure and the second pressure may be less than atmospheric pressure. The first pressure may be less than atmospheric pressure and the second pressure may be greater than atmospheric pressure. The first and second pressures may be less than atmospheric pressure and the first pressure may be less than the second pressure. The first and second pressures may be less than atmospheric pressure and the first pressure may be greater than the second pressure.

The illumination source may produce structured illumination comprising at least one structured pattern of laser light. The structured pattern of laser light may comprise a plurality of evenly-spaced, parallel lines of laser light. When a plurality of structured patterns of lines of laser light are used, the patterns may comprise evenly-spaced, parallel lines of laser light with different thicknesses of the laser lines. When a plurality of structured patterns of lines of laser light are used, the patterns may comprise evenly-spaced, parallel lines of laser light with different widths of spacing between the laser lines. The illumination source may be operable to produce structured illumination which is incident on the packet at at least one orientation. The illumination source may be operable to produce structured illumination which is swept over the packet. The illumination source may comprise a laser light projector.

The illumination detector may capture illumination reflected from the packet over a period of time at the first pressure to produce the first image dataset of the packet. The illumination detector may capture illumination reflected from the packet over a period of time at the first pressure to produce the first image dataset of the packet by capturing a plurality of pictures of the packet over the period of time. The illumination detector may be operable to capture illumination reflected from the packet over a period of time at the second pressure to produce the second image dataset of the packet. The illumination detector may capture illumination reflected from the packet over a period of time at the second pressure to produce the second image dataset of the packet by capturing a plurality of pictures of the packet over the period of time. The period of time may be in the range of approximately 250 ms to approximately 2250 ms. The illumination detector may comprise a camera.

The first and second image datasets of the packet may comprise a plurality of pixel datasets. Each pixel dataset may comprise data for an image pixel of the image datasets. Each pixel dataset may comprise data for an image pixel comprising x, y, z coordinates of the image pixel. The x and y coordinates of each image pixel may be determined relative to a centre image pixel. When the structured illumination incident on the packet comprises a structured pattern comprising a plurality of evenly-spaced, parallel lines of laser light, the z coordinate of each image pixel may be determined by comparing spacing of the plurality of lines of laser light incident on the packet with spacing of the plurality of lines of laser light reflected from the packet. Each pixel dataset may comprise data for an image pixel comprising any of an x, y, z normal, an intensity of captured illumination, a measurement confidence level of the x, y, z coordinates and intensity of the image pixel.

The processor may determine the first and second volumes of the flexible portion of the packet at the first and second pressures by analysing the first and second image datasets to create a first surface representing the flexible portion of the packet, create a second surface representing a plane immediately around the flexible portion of the packet and use the first and second surfaces to determine the first and second volumes.

Creating the first surface may comprise identifying image pixels of the first and second image datasets comprising the flexible portion of the packet, using the x, y, z coordinates of the pixel datasets of the image pixels to plot points representing the image pixels of the flexible portion of the packet, and triangulating the points by creating a line between each point and each neighbouring point to establish a plurality of triangular areas which together comprise the first surface.

Creating the second surface representing the plane immediately around the flexible portion of the packet may comprise identifying image pixels of the first and second image datasets immediately around and a predefined distance from the flexible portion of the packet, using the x, y, z coordinates of the pixel datasets of the image pixels to plot points representing the image pixels and determining a flat surface aligned with at least a majority of the points to be the second surface.

Using the first and second surfaces to determine the first and second volumes may comprise projecting each triangular area of the first surface onto the second surface to form a triangular prism between the surfaces, calculating the volume of each triangular prism and adding the volumes of the triangular prisms.

Using the first volume and the second volume to determine a change in volume of the flexible portion of the packet between the first and second pressures may comprise adding the first and second volumes. Using the first volume and the second volume to determine a change in volume of the flexible portion of the packet between the first and second pressures may comprise subtracting the first and second volumes. This gives the volumetric change of the flexible portion of the packet between the first and second pressures.

The threshold may be determined by testing a statistically significant number of packets that are known to have no leaks and a statistically significant number of packets that are known to have leaks of a known size and determining the threshold to be between the average volume change of packets with no leaks and the average volume change of packets with known leaks.

Therefore when the measured change of volume between the first and second pressures is greater than the threshold the packet can be determined to be leak-free and when the measured change of volume between the first and second pressures is less than the threshold the packet can be determined to have at least one leak.

The first and second pressures may be used to detect a fine leak in the packet i.e. a leak with a width dimension of approximately 3 µm to 50 µm. The first and second pressures may be used to detect a gross leak in the packet i.e. a leak with a width dimension of greater than 50 µm.

The pressure chamber may apply a third pressure to the packet producing a third volume of the flexible portion of the packet and then apply a fourth pressure to the packet producing a fourth volume of the flexible portion of the packet.

The illumination source may produce structured illumination which is incident on the packet at the third and fourth pressures and the illumination detector may capture illumination reflected from the packet at the third pressure and produce a third image dataset of the packet and capture illumination reflected from the packet at the fourth pressure and produce a fourth image dataset of the packet.

The processor may receive the third and fourth image datasets and determine the third volume of the flexible portion of the packet at the third pressure, determine the fourth volume of the flexible portion of the packet at the fourth pressure, use the third volume and the fourth volume to determine a change in volume of the flexible portion of the packet between the third and fourth pressures, compare the change of volume with a further threshold and when the change of volume is greater than the threshold determine that the packet is leak-free and when the change of volume is less than the threshold determine that the packet has at least one leak.

The third pressure may be greater than atmospheric pressure and the fourth pressure may be less than atmospheric pressure. The third pressure may be less than atmospheric pressure and the fourth pressure may be greater than atmospheric pressure. The third and fourth pressures may be less than atmospheric pressure and the third pressure may be less than the fourth pressure. The third and fourth pressures may be less than atmospheric pressure and the third pressure may be greater than the fourth pressure.

The third and fourth image datasets of the packet may comprise a plurality of pixel datasets. Each pixel dataset may comprise data for an image pixel. Each pixel dataset of the image datasets may comprise x, y, z coordinates of the image pixel. The x and y coordinates of each image pixel may be determined relative to a centre image pixel. When the structured illumination incident on the packet comprises a structured pattern comprising a plurality of evenly-spaced, parallel lines of laser light, the z coordinate of each image pixel may be determined by comparing spacing of the plurality of lines of laser light incident on the packet with spacing of the plurality of lines of laser light reflected from the packet. Each pixel dataset may further comprise any of an x, y, z normal, an intensity of captured illumination, a measurement confidence level of the x, y, z coordinates and intensity.

The processor may determine the third and fourth volumes of the flexible portion of the packet at the third and fourth pressures by analysing the first and second image datasets to create a first surface representing the flexible portion of the packet, create a second surface representing a plane immediately around the flexible portion of the packet and use the first and second surfaces to determine the third and fourth volumes.

Creating the first surface may comprise identifying image pixels of the third and fourth image datasets comprising the flexible portion of the packet, using the x, y, z coordinates of the pixel datasets of the image pixels to plot points representing the image pixels of the flexible portion of the packet, and triangulating the points by creating a line between each point and each neighbouring point to establish a plurality of triangular areas which together comprise the first surface.

Creating the second surface representing the plane immediately around the flexible portion of the packet may comprise identifying image pixels of the third and fourth image datasets immediately around and a predefined distance from the flexible portion of the packet, using the x, y, z coordinates of the pixel datasets of the image pixels to plot points representing the image pixels and determining a flat surface aligned with at least a majority of the points to be the second surface.

Using the first and second surfaces to determine the third and fourth volumes may comprise projecting each triangular area of the first surface onto the second surface to form a triangular prism between the surfaces, calculating the volume of each triangular prism and adding the volumes of the triangular prisms.

The third and fourth pressures may be used to detect a gross leak in the packet i.e. a leak with dimensions greater than 50 µm. The first and second pressures may be used to detect a fine leak in the packet i.e. a leak with dimensions of approximately 3 µm to 50 µm.

According to a second aspect of the invention there is provided a leak detection method for detecting leaks in flexible packets, comprising placing at least one packet comprising at least one flexible portion on a test bed within a pressure chamber, operating the pressure chamber to apply a first pressure to the packet to produce a first volume of the flexible portion of the packet and then apply a second pressure to the packet to produce a second volume of the flexible portion of the packet, operating an illumination source to produce structured illumination incident on the packet at the first and second pressures, operating an illumination detector to capture illumination reflected from the packet at the first pressure and produce a first image dataset of the packet and to capture illumination reflected from the packet at the second pressure and produce a second image dataset of the packet, using a processor connected to the illumination detector to receive the first and second image datasets of the packet to determine the first volume of the flexible portion of the packet at the first pressure, to determine the second volume of the flexible portion of the packet at the second pressure, use the first volume and the second volume to determine a change in volume of the flexible portion of the packet between the first and second pressures, compare the change of volume with a threshold and when the change of volume is greater than the threshold determine that the packet is leak-free and when the change of volume is less than the threshold determine that the packet has at least one leak.

The leak detection system and method may be used to detect leaks in packets comprising any of blister packs, strip packs and sachets.

For blister packs and strip packs, the flexible portion of the pack may comprise a cover for one or more pockets of the pack. The cover is generally formed of a flexible, breakable material such as foil, to allow release of contents from the pockets. For sachets, the flexible portion of the pack may comprise a flexible wall of the sachet surrounded by a seal.

Other objects, advantages and novel features of the present disclosure will become apparent from the following detailed description when considered in conjunction with the accompanying drawings, all of which are contemplated to be part of the inventive disclosure.

BRIEF DESCRIPTION OF THE DRAWINGS

An embodiment of the invention will now be described by way of example only with reference to the accompanying drawings, in which.

DETAILED DESCRIPTION

For simplicity and illustrative purposes, the principles of the present disclosure are described by referring mainly to various exemplary embodiments thereof. Although the preferred embodiments are particularly disclosed herein, one of ordinary skill in the art will readily recognize that the same principles are equally applicable to, and can be implemented in other systems, and that any such variation would be within such modifications that do not part from the true spirit and scope of the present disclosure. Before explaining the disclosed embodiments in detail, it is to be understood that the disclosure is not limited in its application to the details of any particular arrangement shown, since the teachings are capable of other embodiments. The terminology used herein is for the purpose of description and not of limitation.

Figure 1:
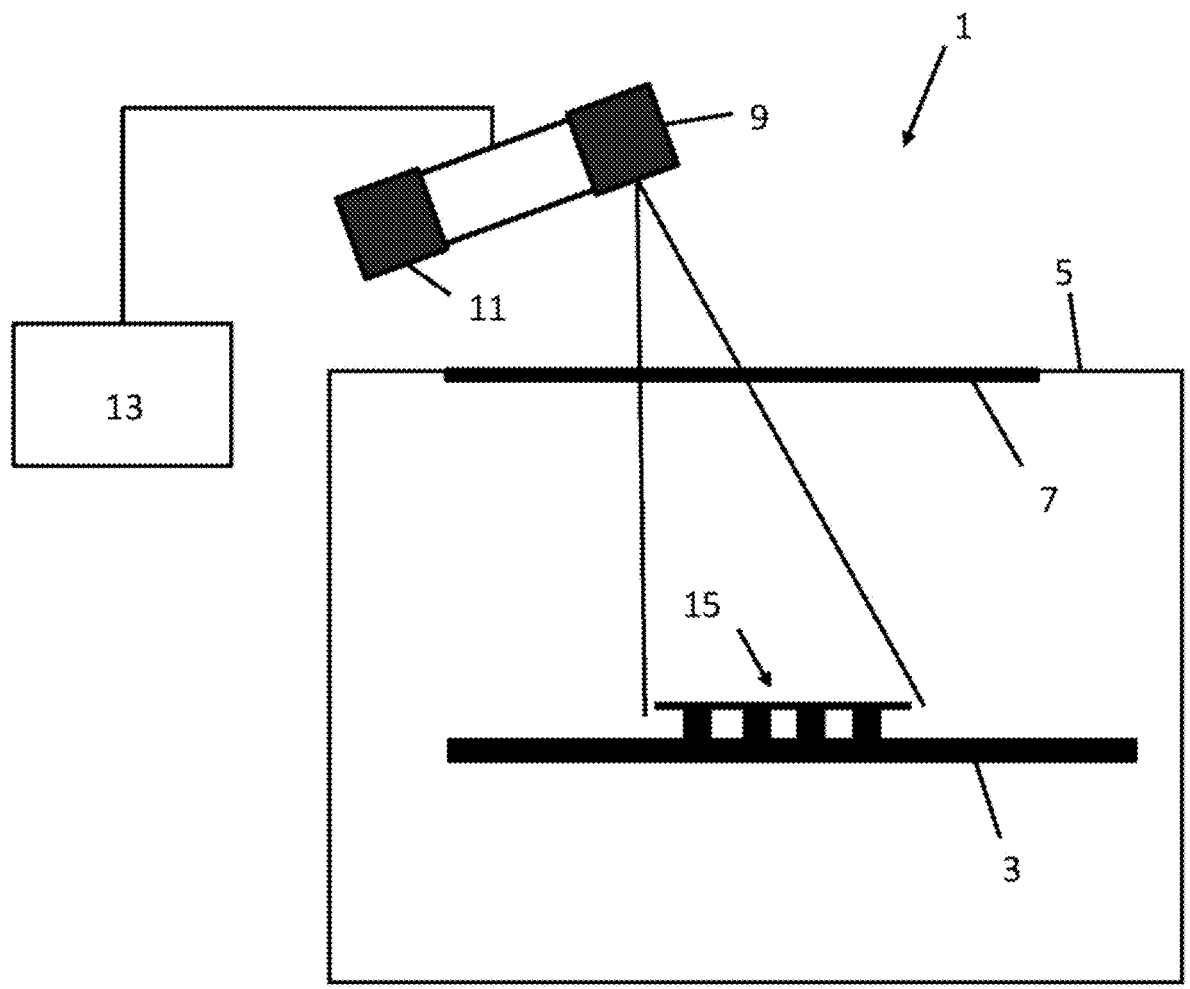
FIG. 1 is a schematic representation of a leak detection system according to the first aspect of the invention.
Figure 2:
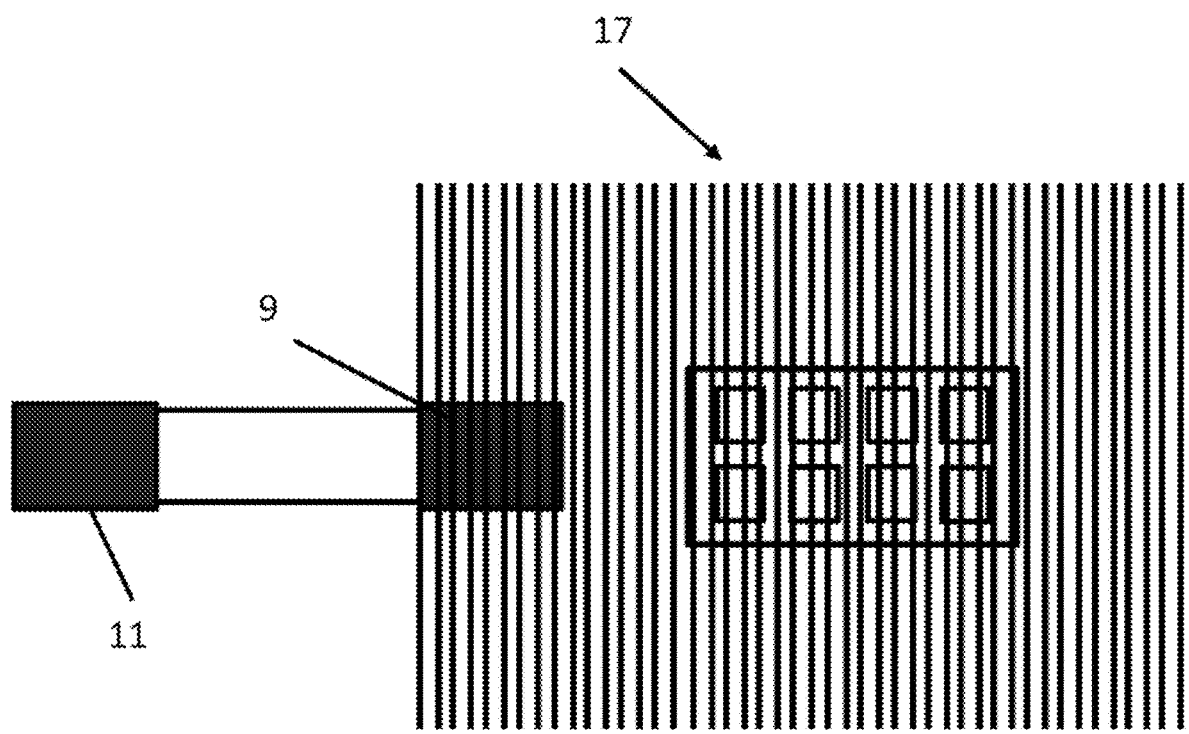
FIG. 2 is a schematic representation of part of the leak detection system of FIG. 1, and FIGS. 3a to 3e are schematic representations of packet volume changes.

Referring to FIGS. 1 and 2, the leak detection system 1 comprises a test bed 3, a pressure chamber 5, an illumination source 9, an illumination detector 11 and a processor 13.

The test bed 3 is contained within the pressure chamber 5, as shown. The test bed 3 comprises a substantially flat surface which supports a packet 15 having a plurality of flexible portions in an uppermost position.

In this embodiment, the illumination source 9 and the illumination detector 11 are placed outside the pressure chamber 5. The pressure chamber 5 comprises a transparent section 7 through which illumination incident on the packet 15 and illumination reflected from the packet 15 pass. It will be appreciated that, in other embodiments, the illumination source and the illumination detector may be placed inside the pressure chamber.

The pressure chamber 5 is operable to apply a first pressure to the packet 15 and then apply a second pressure to the packet 15. In this embodiment, the first pressure is greater than atmospheric pressure and causes the flexible portions of the packet 15 to deflect inwardly to produce first volumes of the flexible portions of the packet 15 and the second pressure is less than atmospheric pressure and causes the flexible portions of the packet 15 to deflect outwardly to produce second volumes of the flexible portions of the packet 15. It will be appreciated that, in other embodiments, the first pressure may be less than atmospheric pressure and the second pressure greater than atmospheric pressure or the first and second pressures may be less than atmospheric pressure and the first pressure may be less than the second pressure, or the first and second pressures may be less than atmospheric pressure and the first pressure may be greater than the second pressure.

The illumination source 9 is operable to produce structured illumination which is incident on the packet 15, when the pressure chamber 5 applies the first and second pressures. In this embodiment, the illumination source 9 comprises a laser light projector, which is operable to produce structured illumination comprising one structured pattern of laser light. The structured pattern of laser light comprises a plurality of evenly-spaced, parallel lines of laser light 17. The structured pattern of evenly-spaced, parallel lines of laser light 17 has a spacing between the lines of laser light 17 which is chosen by the user of the leak detection system 1. The spacing between the lines of laser light 17 is therefore known.

In this embodiment, the illumination detector 11 comprises a camera. When the pressure chamber 5 applies the first pressure, the camera 11 is operable to capture illumination reflected from the packet 15 in a plurality of pictures of the packet 15 over a period of time and produce a first image dataset of the packet 15. When the pressure chamber 5 applies the second pressure, the camera 11 is operable to capture illumination reflected from the packet 15 in a plurality of pictures of the packet 15 over a period of time and produce a second image dataset of the packet 15. The period of time may be in the range of approximately 250 ms to approximately 2250 ms.

The processor 13 is connected to the illumination detector 11 to receive the first and second image datasets. The processor 13 is operable to analyse the first image dataset to determine the first volume of at least one of the flexible portions of the packet 15 at the first pressure, analyse the second image dataset to determine the second volume of at least one of the flexible portions of the packet 15 at the second pressure, use the first volume and the second volume to determine a change in volume of the flexible portion of the packet 15 between the first and second pressures, compare the change of volume with a threshold and when the change of volume is greater than the threshold determine that the packet 15 is leak-free and when the change of volume is less than the threshold determine that the packet 15 has at €east one leak.

Referring to FIG. 3, a leak detection method according to the second aspect of the invention carried out by the leak detection system 1 will be described, with reference to packet 15. The packet 15 comprises a blister pack. It will be appreciated, however, that the method can be used with other types of flexible packet.

The blister pack 15 comprises a base which has a planar component from which depends a number of individual pockets for the receipt of, for example, tablets. A cover is attached to the planar component of the base, to seal the tablets and air within the pockets. The cover is formed of a flexible, breakable material such as foil, to allow release of the tablets from the pockets. The blister pack 15 therefore comprises a plurality of flexible portions, each comprising a flexible portion of the cover over a pocket of the pack 15. It is important that each pocket of the blister pack 15 is substantially airtight, with no leaks in either the base or the cover. The leak detection system 1 and leak detection method is used to investigate for leaks in at least one, preferable all, of the pockets of the blister pack 15.

The blister pack 15 is placed on the test bed 3, so that the cover of the pack is uppermost. The pressure chamber 5 is closed. The air pressure within the pressure chamber 5 is changed to a first pressure which is greater than atmospheric pressure. When the first pressure is applied to the pack 15, the air within each of the pockets will be compressed, causing each flexible portion of the cover over each pocket to deflect inwardly producing a first volume of each flexible portion of the cover.

The laser light projector 9 is operated to produce structured illumination in the form of a structured pattern comprising the plurality of evenly-spaced, parallel lines of laser light 17. The structured pattern has a spacing between the lines 17 which is chosen by the user of the leak detection system 1 and is therefore known. The plurality of evenly-spaced, parallel lines of laser light 17 are incident on the blister pack 15. The plurality of lines of laser light 17 are incident on the cover of the blister pack 15 and the lines of laser light follow contours of the cover. As the flexible portions of the cover over the pockets deflect inwardly with the change in pressure in the chamber 5, the contours of the cover change and the lines of laser light distort to follow the new contours of each flexible portion of the cover over each pocket of the blister pack 15.

When the pressure within the pressure chamber 5 reaches the first pressure, the camera 11 is operated to capture illumination reflected from the blister pack 15 in a plurality of pictures of the pack 15 over a period of time and produce a first image dataset of the pack 15. The period of time may be in the range of approximately 250 ms to approximately 2250 ms. The first image dataset will comprise a plurality of pictures of the flexible portions of the cover over the pockets of the blister pack 15 and parts of the cover between the pockets.

The air pressure within the pressure chamber 5 is then changed to a second pressure which is less than atmospheric pressure. When the second pressure is applied to the blister pack 15, the air within each of the pockets will expand, causing each flexible portion of the cover over each pocket to deflect outwardly, producing a second volume of each flexible portion of the cover.

The laser light projector 9 is operated to produce structured illumination in the form of a structured pattern comprising the plurality of evenly-spaced, parallel lines of laser light 17. The structured pattern has a spacing between the lines 17 which is chosen by the user of the leak detection system 1 and is therefore known. The plurality of evenly-spaced, parallel lines of laser light 17 are incident on the blister pack 15. The plurality of lines of laser light 17 are incident on the cover of the blister pack 15 and the lines of laser light follow contours of the cover. As the flexible portions of the cover over the pockets deflect outwardly with the change in pressure in the chamber 5, the contours of the cover change and the lines of laser light distort to follow the new contours of each flexible portion of the cover over each pocket of the blister pack 15.

When the pressure within the pressure chamber 5 reaches the second pressure, the camera 11 is operated to capture illumination reflected from the blister pack 15 in a plurality of pictures of the pack 15 over a period of time and produce a second image dataset of the pack 15. The period of time may be in the range of approximately 250 ms to approximately 2250 ms. The second image dataset will comprise a plurality of pictures of the flexible portions of the cover over the pockets of the blister pack 15 and parts of the cover between the pockets.

The first and second image datasets of the blister pack 15 comprise a plurality of pixel datasets. Each pixel dataset of the image datasets comprises data for an image pixel of the pack 15. Each pixel dataset comprises data for an image pixel comprising x, y, z coordinates of the image pixel. The x and y coordinates of each image pixel are determined relative to a centre image pixel. The z coordinate of each image pixel represents a depth coordinate. The z coordinate of each image pixel is determined by comparing the known spacing of the plurality of lines of laser light 17 of the structured pattern incident on the blister pack 15 with spacing of the plurality of lines of laser light reflected from the pack 15. Each pixel dataset comprises data for an image pixel comprising any of an x, y, z normal, an intensity of captured illumination, a measurement confidence level of the x, y, z coordinates and intensity of the image pixel.

The processor 13 is connected to the camera 11 to receive the first and second image datasets. The processor 13 analyses the first image dataset to determine the first volume of one or more, and preferably each, flexible portion of the cover over the pockets of the blister pack 15 and analyses the second image dataset to determine the second volume of one or more, and preferably each, flexible portion of the cover over the pockets of the blister pack 15.

Figure 3A:
Figure 3B:

Referring to FIG. 3*a*, a cross sectional view of one of the pockets of the blister pack 15 at the first pressure is shown. It can be seen that the flexible portion of the cover over the pocket is deflected inwardly, producing the first volume of the flexible portion of the pack 15. Referring to FIG. 3*b*, a cross sectional view of the same pocket of the blister pack 15 at the second pressure is shown. It can be seen that the flexible portion of the cover over the pocket is deflected outwardly, producing the second volume of the flexible portion of the pack 15.

The processor 13 determines the first and second volumes of this flexible portion of the blister pack 15 at the first and second pressures by analysing the first and second image datasets. For each image dataset, the analysis comprises creating a first surface representing the inwardly or outwardly deflected flexible portion of the blister pack 15, creating a second surface representing a plane immediately around the flexible portion of the pack 15 and using the first and second surfaces to determine the first and second volumes.

Creating the first surface comprises identifying image pixels of the first and second image datasets comprising the flexible portion of the packet, using the x, y, z coordinates of the pixel datasets of the image pixels to plot points representing the image pixels of the flexible portion of the packet, and triangulating the points by creating a line between each point and each neighbouring point to establish a plurality of triangular areas which together comprise the first surface.

Creating the second surface representing the plane immediately around the flexible portion of the pack 15 comprises identifying image pixels of the first and second image datasets immediately around and a predefined distance from the flexible portion of the packet, using the x, y, z coordinates of the pixel datasets of the image pixels to plot points representing the image pixels and determining a flat surface aligned with at least a majority of the points to be the second surface.

Using the first and second surfaces to determine the first and second volumes comprises projecting each triangular area of the first surface onto the second surface to form a triangular prism between the surfaces, calculating the volume of each triangular prism and adding the volumes of the triangular prisms.

Figure 3C:
Figure 3D:
Figure 3E:

Two volumes are determined for the flexible portion of the cover of the pocket of the blister pack 15, a first volume when the first pressure, greater than atmospheric pressure, is applied within the pressure chamber 5, see FIG. 3*c*, and a second volume when the second pressure, less than atmospheric pressure, is applied within the pressure chamber 5, see FIG. 3*d*. The first and second volumes are added to give a change of volume of the flexible portion of the cover of the pocket with change of pressure in the pressure chamber 5, see FIG. 3*e*. The change of volume for the flexible portion of the cover of the pocket is compared with a threshold and when the change of volume is greater than the threshold the pocket of the blister pack 15 is determined to be leak-free and when the change of volume is less than the threshold the pocket of the blister pack 15 is determined to have at least one leak.

If a pocket of the blister pack 15 is leak-free, when the first pressure is applied within the pressure chamber 5, the air within the pocket will be compressed forcing the flexible portion of the cover over the pocket to deflect inwardly to a maximum extent. When the second pressure is applied within the pressure chamber 5, the air within the pocket will expand forcing the flexible portion of the cover of the pocket to deflect outwardly to a maximum extent. There will then be a marked difference between the first and second volumes of the pocket and the change of volume of the pocket with change of pressure will exceed a threshold and the pocket will be determined to be leak-free.

If a pocket of the blister pack 15 is not leak-free, when the first pressure is applied within the pressure chamber 5, the air within the pocket will be compressed forcing the flexible portion of the cover over the pocket to deflect inwardly, but then the air will leak from the chamber into the pocket and the deflection of the flexible portion of the cover over the pocket will decrease. When the second pressure is applied within the pressure chamber 5, the remaining air within the pocket will expand forcing the flexible portion of the cover over the pocket to move outwardly. There will not be a marked difference between the first and second volumes of the pocket and the change of volume of the pocket with change in pressure will not exceed the threshold and the pocket will not be determined to be leak-free.

The processor 13 then preferably analyses the first and second image datasets to determine first and second volumes of each flexible portion of the cover over each pocket of the blister pack 15 at the first and second pressures. A leak detection result for the whole blister pack 15 can then be given.

The leak detection system and method has been described, in this embodiment, with reference to leak detection of one blister pack 15. It will be appreciated, however, that the system ad method may be used for leak detection of a plurality of blister packs and for leak detection of one or more flexible packets of other types, e.g. one or more sachets.

The leak detection system and method is unaffected by blister pack movement between capturing the first image dataset at the first pressure and capturing the second image dataset at the second pressure as the first and second surfaces are determined for the first image dataset and then redetermined for the second image dataset. The leak detection system and method is also unaffected by the type of material of the covers of the blister packs due to the use of laser light. Using volume measurements of each pocket at each pressure separately, reduces the effect of pockets on each other.

While the disclosure provides certain exemplary embodiments, those skilled in the art may make various modifications to the described embodiments without departing from the true spirit and scope of the disclosure. The terms and descriptions used herein are set forth by way of illustration only and not meant as limitations. In particular, although the present disclosure is provided by way of examples, a variety of devices would practice the inventive concepts described herein. Although the disclosure provides various terms and certain embodiments, the scope of the disclosure is not intended to be, nor should it be deemed to be, limited thereby and such other modifications or embodiments as may be suggested by the teachings herein are particularly reserved, especially as they fall within the breadth and scope of the claims here appended. It is expressly contemplated that the features and elements of the various embodiments described herein may be combined and the full variety of combinations and permutations are expressly contemplated by this disclosure. Those skilled in the art will recognize that these and other variations are possible within the spirit and scope of the disclosure as defined in the following claims and their equivalents.

The invention claimed is:

1. A leak detection system for detecting leaks in flexible packets, comprising
a test bed which supports at least one packet comprising at least one flexible portion,
a pressure chamber containing the test bed and the packet which applies a first pressure to the packet producing a first volume of the flexible portion of the packet and then applies a second pressure to the packet producing a second volume of the flexible portion of the packet,
an illumination source which produces structured illumination which is incident on the packet at the first pressure and the second pressure,
an illumination detector which captures illumination reflected from the packet at the first pressure and produces a first image dataset of the packet and which captures illumination reflected from the packet at the second pressure and produces a second image dataset of the packet,
a processor connected to the illumination detector to receive the first and second image datasets of the packet and which determines the first volume of the flexible portion of the packet at the first pressure, determines the second volume of the flexible portion of the packet at the second pressure, uses the first volume and the second volume to determine a change in volume of the flexible portion of the packet between the first and second pressures, compares the change of volume with a threshold and when the change of volume is greater than the threshold determines that the packet is leak-free and when the change of volume is less than the threshold determines that the packet has at least one leak,
wherein the first volume and second volume of the flexible portion of the packet are determined by analyzing the first and second image datasets to: create a first surface representing the flexible portion of the packet, create a second surface representing a plane immediately around the flexible portion of the packet, and use the first and second surfaces to determine the first and second volumes,
wherein creating the first surface comprises identifying image pixels of the first and second image datasets comprising the flexible portion of the packet, using x, y, z coordinates of the pixel datasets of the image pixels to plot points representing the image pixels of the flexible portion of the packet, and triangulating the points by creating a line between each point and each neighboring point to establish a plurality of triangular areas which together comprise the first surface,
wherein using the first and second surfaces to determine the first and second volumes comprises projecting each triangular area of the first surface onto the second surface to form a triangular prism between the surfaces, calculating the volume of each triangular prism and adding the volumes of the triangular prisms, and
wherein determining the change in volume of the flexible portion of the packet between the first and second pressures comprises adding the first and second volumes, subtracting the first and second volumes, or any combinations thereof.

2. A leak detection system according to claim 1 in which the first pressure is greater than atmospheric pressure and the second pressure is less than atmospheric pressure.

3. A leak detection system according to claim 1 in which the first pressure is less than atmospheric pressure and the second pressure is greater than atmospheric pressure.

4. A leak detection system according to claim 1 in which the first and second pressures are less than atmospheric pressure and the first pressure is less than the second pressure.

5. A leak detection system according to claim 1 in which the first and second pressures are less than atmospheric pressure and the first pressure is greater than the second pressure.

6. A leak detection system according to claim 1 in which the illumination source produces structured illumination comprising a structured pattern of laser light comprising a plurality of evenly-spaced, parallel lines of laser light.

7. A leak detection system according to claim 1 in which the first and second image datasets of the packet comprise a plurality of pixel datasets which each comprise data for an image pixel of the image datasets.

8. A leak detection system according to claim 7 in which each pixel dataset comprises data for an image pixel comprising any of x, y, z coordinates, an x, y, z normal, an intensity of captured illumination, and intensity of the image pixel.

9. A leak detection system according to claim 1 in which creating the second surface representing the plane immediately around the flexible portion of the packet comprises identifying image pixels of the first and second image datasets immediately around and a predefined distance from the flexible portion of the packet, using the x, y, z coordinates of the pixel datasets of the image pixels to plot points representing the image pixels and determining a flat surface aligned with at least a majority of the points to be the second surface.

10. A leak detection system according to claim 1 in which the pressure chamber applies a third pressure to the packet producing a third volume of the flexible portion of the packet and then applies a fourth pressure to the packet producing a fourth volume of the flexible portion of the packet, the illumination source produces structured illumination which is incident on the packet at the third and fourth pressures, the illumination detector captures illumination reflected from the packet at the third pressure and produces a third image dataset of the packet and captures illumination reflected from the packet at the fourth pressure and produces a fourth image dataset of the packet, the processor receives the third and fourth image datasets and determines the third volume of the flexible portion of the packet at the third pressure, determines the fourth volume of the flexible portion of the packet at the fourth pressure, uses the third volume and the fourth volume to determine a change in volume of the flexible portion of the packet between the third and fourth pressures, compares the change of volume with a further threshold and when the change of volume is greater than the threshold determines that the packet is leak-free and when the change of volume is less than the threshold determines that the packet has at least one leak.

11. A leak detection system according to claim 10 in which the third pressure is greater than atmospheric pressure and the fourth pressure is less than atmospheric pressure.

12. A leak detection system according to claim 10 in which the third pressure is less than atmospheric pressure and the fourth pressure is greater than atmospheric pressure.

13. A leak detection system according to claim 10 in which the third and fourth pressures are less than atmospheric pressure and the third pressure is less than the fourth pressure.

14. A leak detection system according to claim 10 in which the third and fourth pressures are less than atmospheric pressure and the third pressure is greater than the fourth pressure.

15. A leak detection method for detecting leaks in flexible packets,
comprising
placing at least one packet comprising at least one flexible portion on a test bed within a pressure chamber,
operating the pressure chamber to apply a first pressure to the packet to produce a first volume of the flexible portion of the packet and then apply a second pressure to the packet to produce a second volume of the flexible portion of the packet,
operating an illumination source to produce structured illumination incident on the packet at the first and second pressures,
operating an illumination detector to capture illumination reflected from the packet at the first pressure and produce a first image dataset of the packet and to capture illumination reflected from the packet at the second pressure and produce a second image dataset of the packet,
using a processor connected to the illumination detector to receive the first and second image datasets of the packet to determine the first volume of the flexible portion of the packet at the first pressure, to determine the second volume of the flexible portion of the packet at the second pressure, use the first volume and the second volume to determine a change in volume of the flexible portion of the packet between the first and second pressures, compare the change of volume with a threshold and when the change of volume is greater than the threshold determine that the packet is leak-free and when the change of volume is less than the threshold determine that the packet has at least one leak,
wherein the first volume and second volume of the flexible portion of the packet are determined by analyzing the first and second image datasets to: create a first surface representing the flexible portion of the packet, create a second surface representing a plane immediately around the flexible portion of the packet, and use the first and second surfaces to determine the first and second volumes, and
wherein determining the change in volume of the flexible portion of the packet between the first and second pressures comprises adding the first and second volumes, subtracting the first and second volumes, or any combinations thereof.

16. A leak detection system for detecting leaks in flexible packets, comprising
a test bed which supports at least one packet comprising at least one flexible portion,
a pressure chamber containing the test bed and the packet which applies a first pressure to the packet producing a first volume of the flexible portion of the packet, applies a second pressure to the packet producing a second volume of the flexible portion of the packet, applies a third pressure to the packet producing a third volume of the flexible portion of the packet,
applies a fourth pressure to the packet producing a fourth volume of the flexible portion of the packet,
an illumination source which produces structured illumination which is incident on the packet at the first pressure, the second pressure, the third pressure, and the fourth pressure,
an illumination detector which captures:
illumination reflected from the packet at the first pressure and produces a first image dataset of the packet;
illumination reflected from the packet at the second pressure and produces a second image dataset of the packet;
illumination reflected from the packet at the third pressure and produces a third image dataset of the packet;
illumination reflected from the packet at the fourth pressure and produces a fourth image dataset of the packet;
a processor connected to the illumination detector to receive the first image dataset, the second image dataset, the third image dataset, and the fourth data set of the packet and which determines the first volume of the flexible portion of the packet at the first pressure, determines the second volume of the flexible portion of the packet at the second pressure, determines the third volume of the flexible portion of the packet at the third pressure, determines the fourth volume of the flexible portion of the packet at the fourth pressure, uses the first volume and the second volume to determine a first change in volume of the flexible portion of the packet between the first and second pressures, uses the third volume and the fourth volume to determine a second change in volume of the flexible portion of the packet between the third and fourth pressures, compares the first change of volume with a first threshold and when the first change of volume is greater than the first threshold determines that the packet is leak-free and when the first change of volume is less than the first threshold determines that the packet has at least one first leak, compares the second change of volume with a second threshold and when the second change of volume is greater than the second threshold determines that the packet is leak-free and when the second change of volume is less than the second threshold determines that the packet has at least one second leak, wherein the at least one first leak is a fine leak, wherein the at least one second leak is a gross leak,
wherein the first volume and second volume of the flexible portion of the packet are determined by analyzing the first and second image datasets to: create a first surface representing the flexible portion of the packet, create a second surface representing a plane immediately around the flexible portion of the packet, and use the first and second surfaces to determine the first and second volumes,
wherein the third volume and fourth volume of the flexible portion of the packet are determined by analyzing the third and fourth image datasets to: create a third surface representing the flexible portion of the packet, create a fourth surface representing a plane immediately around the flexible portion of the packet, and use the third and fourth surfaces to determine the third and fourth volumes, and
wherein determining the first change in volume of the flexible portion of the packet between the first and second pressures comprises adding the first and second volumes, subtracting the first and second volumes, or any combinations thereof.

17. The leak detection system of claim 16, wherein the gross leak is a leak with a dimension greater than 50 μm.

18. The leak detection system of claim 16, wherein the fine leak is a leak with a width dimension of approximately 3 μm to 50 μm.

* * * * *